March 31, 1953 L. D. BURCH 2,632,998
MULTIPLE STAGE ROTARY TRANSLATION ENGINE
Filed Aug. 3, 1946 6 Sheets-Sheet 1
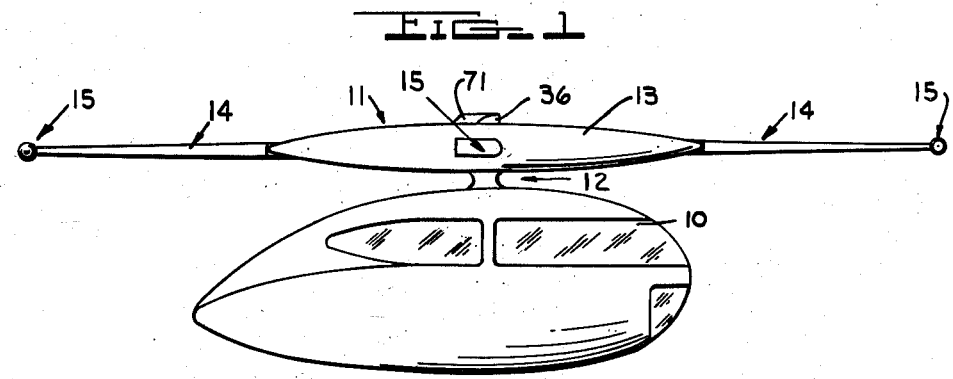
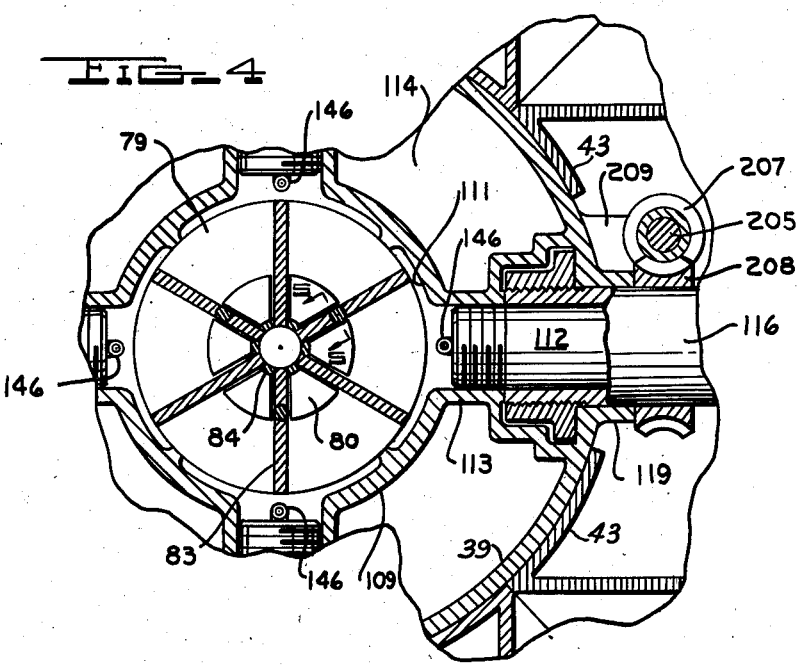
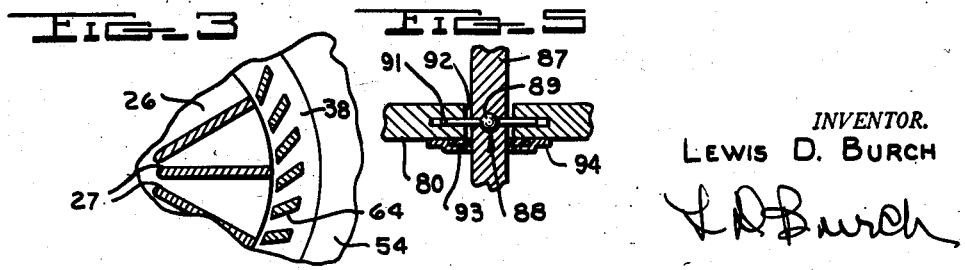
INVENTOR.
LEWIS D. BURCH

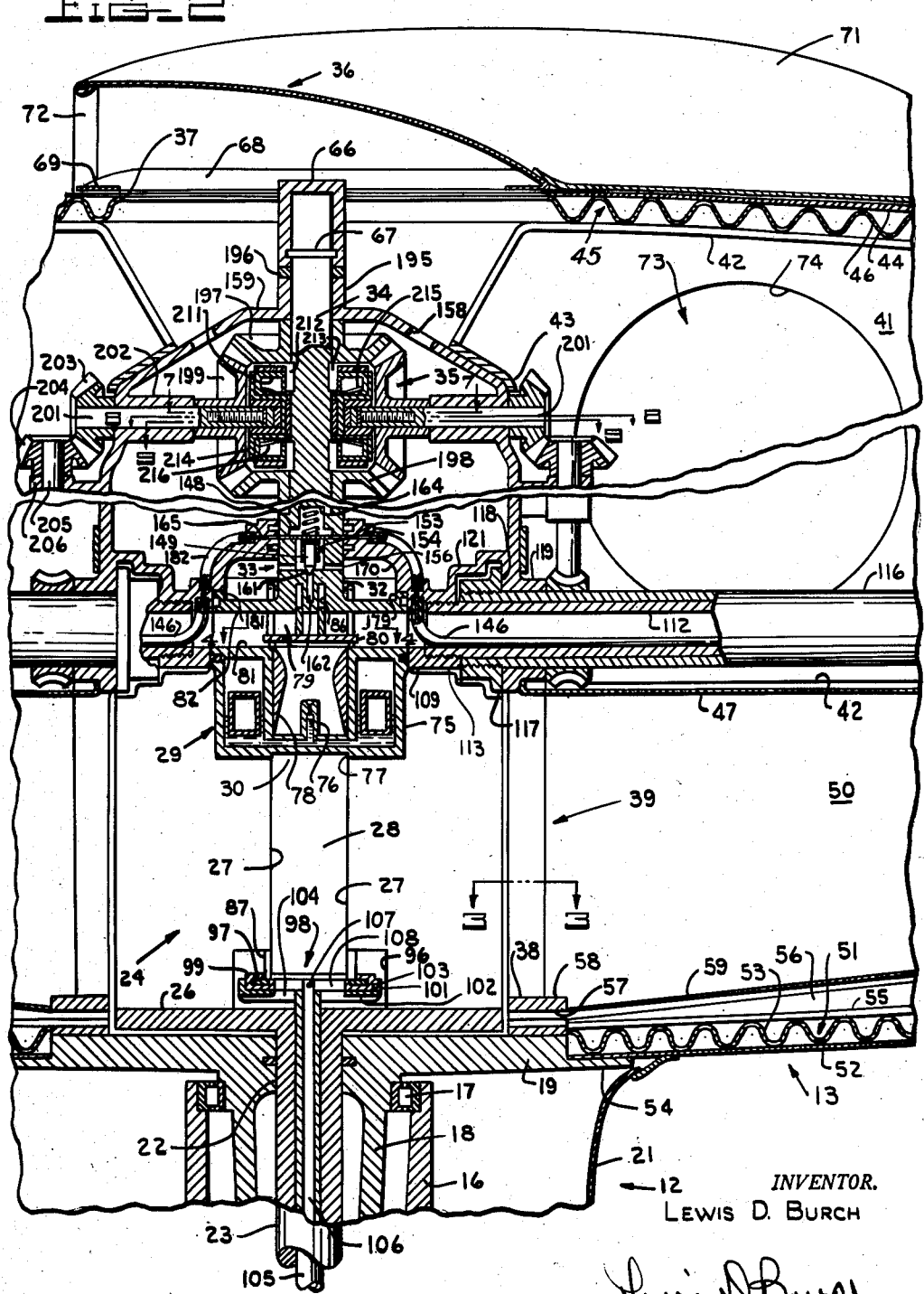

March 31, 1953 L. D. BURCH 2,632,998
MULTIPLE STAGE ROTARY TRANSLATION ENGINE
Filed Aug. 3, 1946 6 Sheets-Sheet 3
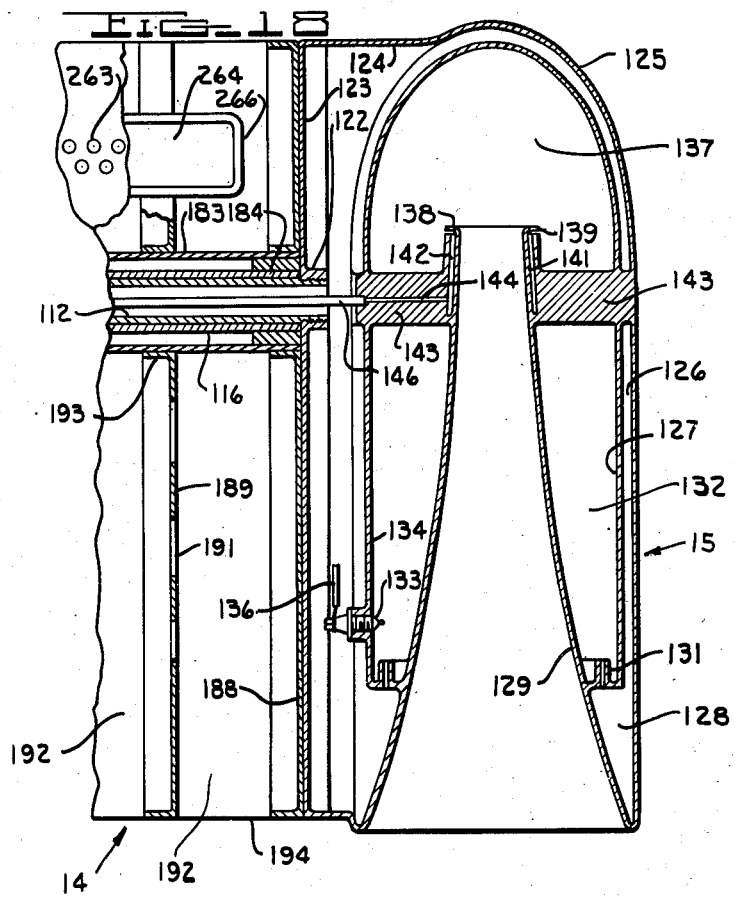
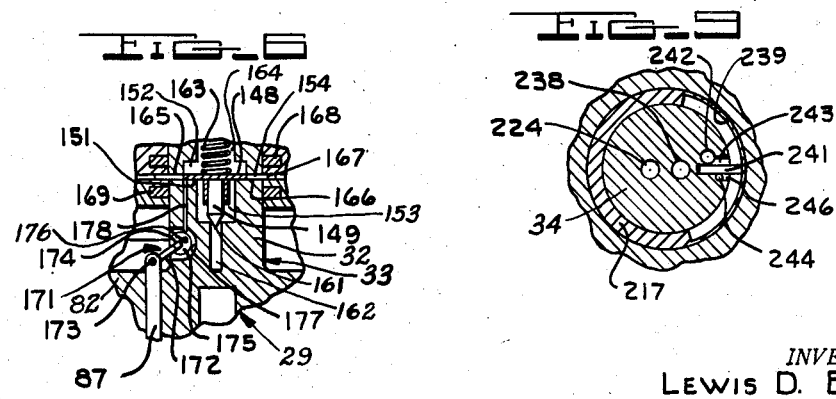
INVENTOR.
LEWIS D. BURCH March 31, 1953  L. D. BURCH  2,632,998
MULTIPLE STAGE ROTARY TRANSLATION ENGINE
Filed Aug. 3, 1946  6 Sheets-Sheet 4
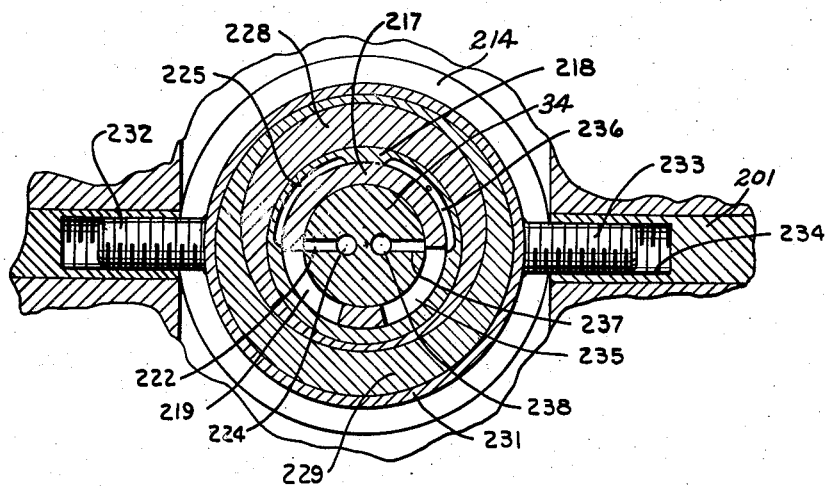
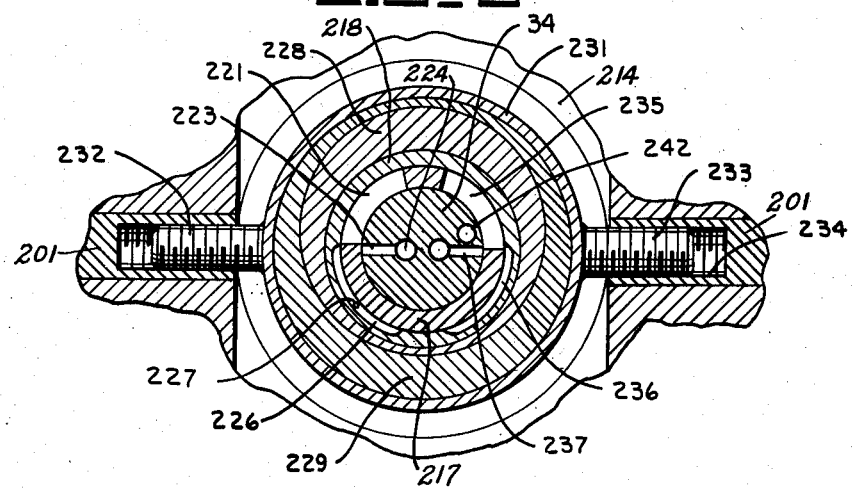
INVENTOR.
LEWIS D. BURCH March 31, 1953 L. D. BURCH 2,632,998
MULTIPLE STAGE ROTARY TRANSLATION ENGINE
Filed Aug. 3, 1946 6 Sheets-Sheet 5
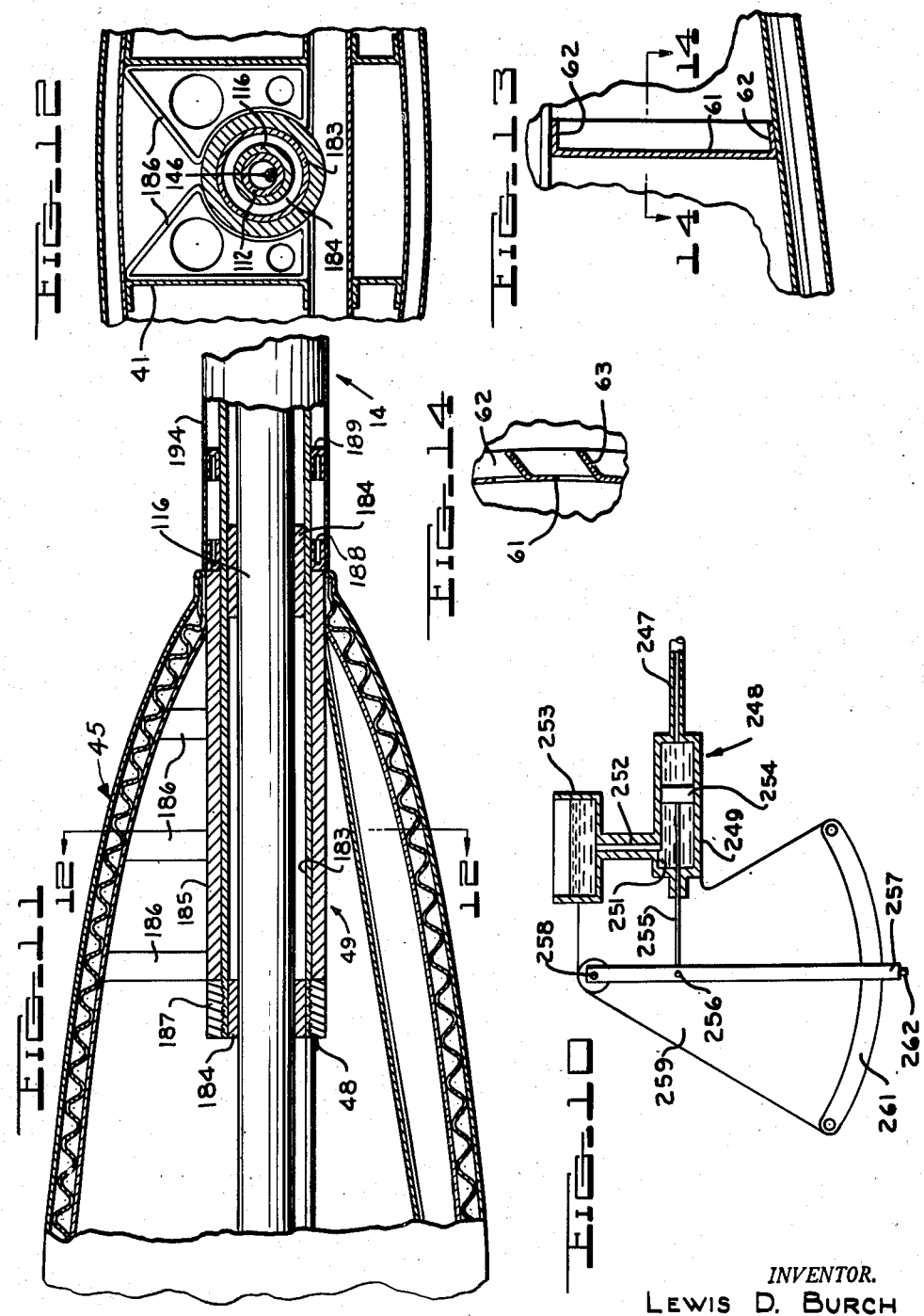
INVENTOR.
LEWIS D. BURCH

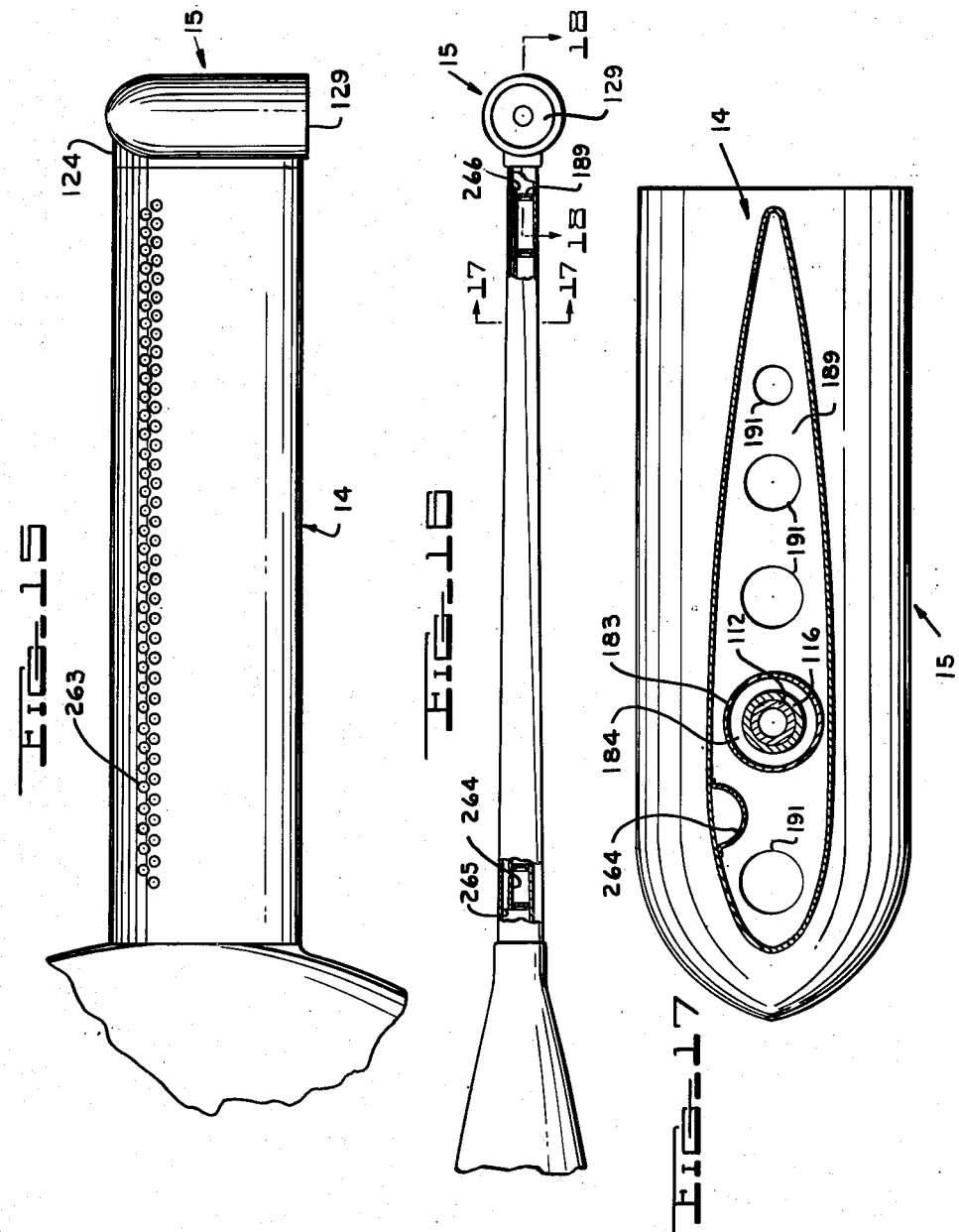

Patented Mar. 31, 1953

2,632,998

UNITED STATES PATENT OFFICE 2,632,998

MULTIPLE STAGE ROTARY TRANSLATION ENGINE

Lewis D. Burch, Detroit, Mich.

Application August 3, 1946, Serial No. 688,280

16 Claims. (Cl. 60—39.34)

This invention relates to rotary wing aircraft and particularly to improvements in rotary wing aircraft as disclosed in my copending applications for patents Serial No. 606,013, filed July 19, 1945, and Serial No. 220,565, filed April 12, 1951, as a continuation-in-part of Serial No. 665,808 filed April 29, 1946, the last now abandoned.

The present rotary wing aircraft embodies an improved rotary flying unit or air wheel or rotary translation engine having a wing and combustor supporting disc or rotor the upper portion of which is employed in centrifugally compressing air for supercharging the charge forming device for the engine, while the lower portion thereof merely provides an annular conduit for moving supercharged air from the region of compression at the periphery of the disc or rotor to the charge forming device at the axis thereof.

The air wheel also includes a novel structure for varying the angle of attack of the wings in which the wings are moved into any desired operative position by the relative movement of worm and worm wheel structures which in turn are actuated in either direction by a pneumatically operated gear mechanism driven when the angle of attack is being changed by relative movement between the cabin and the disc. When the angle of attack is not being changed the mechanism is out of operation, the wings being held in the desired position by the angle of purchase between the worm and the worm wheel structures.

Another novel feature of the air wheel is the utilization of the phenomenon of resonance for stabilizing the wings during translatory flight. By this means any slight inequality in lift among the wings causes a pumping or breathing action within the wings which is accentuated by resonance to increase or decrease the lift exerted by each wing to such an extent that such inequality will be limited to an insignificant value.

Still another improved feature of the air wheel is the provision of simplified means for forming and handling the charge and the expansible fluid, delivering the same to the combustors, and the novel construction of the combustors for efficiently utilizing such charge and fluid.

An object of the invention is to provide an improved, lighter, simpler, and more efficient flying unit for this type of aircraft.

In the drawings:

Figure 1 is a side elevational view of a rotary wing aircraft embodying the invention.

Figure 2 is a fragmentary vertical sectional view taken through the axis of rotation of the air wheel embraced in the aircraft shown by Figure 1. The upper part of the view is rotated a few degrees with respect to the lower part.

Figure 3 is a fragmentary cross sectional view of a lower portion of the stator and rotor structure taken substantially on line 3—3 of Figure 2.

Figure 4 is another fragmentary cross sectional view taken through the charge forming device and distributing manifold structure substantially on line 4—4 of Figure 2.

Figure 5 is a fragmentary vertical sectional view of one of the universal supports for the throttle valve taken substantially on line 5—5 of Figure 4.

Figure 6 is a fragmentary vertical sectional view taken axially through the water valve structure shown by Figure 2 in a plane rotated thirty degrees with respect to the plane of Figure 2.

Figures 7, 8 and 9 are still other fragmentary cross sectional views taken through the mechanism for varying the angle of attack of the wings and taken substantially on lines 7—7, 8—8 and 9—9, respectively, of Figure 2.

Figure 10 is a diagrammatical illustration partly in elevation and partly in cross section of an actuating mechanism for operating the valve mechanism of the structure for controlling the angle of attack of the wings as shown by Figures 7, 8 and 9.

Figure 11 is a fragmentary vertical sectional view of the air wheel taken in the same plane as Figure 2 except adjacent the periphery of the supporting disc or rotor portion thereof.

Figure 12 is a fragmentary cross sectional view of a portion of the rotor taken substantially on line 12—12 of Figure 11.

Figure 13 is a fragmentary cross sectional view of a lower intermediate portion of the rotor taken in the same plane as and substantially midway between the views of the disc shown by Figures 2 and 11.

Figure 14 is a fragmentary cross sectional view of an annual supporting rib structure employed in the rotor and taken substantially on line 14—14 of Figure 13.

Figure 15 is a plan view of one of the four wings and combustors of the air wheel showing a fragmentary portion of the supporting disc to which one end of the wing is attached.

Figure 16 is a rear elevational view of the structure shown by Figure 15 with parts thereof broken away to show in vertical sectional view the interior of the front portion of each end of the wing.

Figure 17 is a vertical sectional view through the wing shown by Figure 15 as it would appear substantially on line 17—17 of Figure 16.

Figure 18 is a horizontal sectional view through the outer end of the wing and the combustor taken substantially on line 18—18 of Figure 16.

Referring particularly to Figure 1 there is illustrated an aircraft cabin 10 located beneath and in flight supported by a rotary flying unit, engine or air wheel 11. A bearing structure 12 is employed between the two elements for permitting the rotation of one relative to the other. The cabin 10 may be constructed in any suitable manner to be capable of supporting itself and the load to be carried as the cabin is practically independent of any of the stresses resulting from the operation of the air wheel 11. The air wheel 11 comprises a circular airfoil, supporting disc or rotor structure 13 having wings 14 extending radially outwardly therefrom in the plane of the disc. Direct reaction jet propulsion engines or combustors 15 are located at the outer ends of wings 14 for propelling the air wheel 11 about the axis of the disc 13 and upon the bearing 12. In the structure shown there are four equally spaced pairs of wings and engines or combustors about the periphery of the disc, only three of such pairs being visible in Figure 1.

Referring now to Figure 2 the bearing 12 comprises an outer cylinder 16 rigidly anchored at its lower end within the upper portion of the cabin 10. Within the cylinder 16 is rotatably mounted on roller bearings 17 a smaller cylindrical bearing member 18 having a radially projecting flange 19 formed at the upper end thereof above the cylinder 16. A thrust bearing and the other of the roller bearings 17 are operatively positioned at the lower ends of the cylinders 16 and 18 to provide for the continuous rotation of the latter in the former when lift and rotary motion is applied to the flange 19. The outer portion of the bearing 12 is provided by a cowling 21 which extends between the cabin 10 and the rotor 13 for covering the bearing and protecting the same from exposure to the weather.

The flange portion 19 of the bearing 12 is provided with an internal bearing 22 in which is mounted the shaft portion 23 of a stator 24 which projects upwardly from the flange 19 within the interior of the rotor 13. The lower end of the shaft 23 extends downwardly through an opening formed in cylinder 18 to a region not shown below the lower end of the cylinder 18 where it is supported rigidly and nonrotatably within the upper portion of the cabin 10.

The stator 24 comprises a flange 26 spaced slightly above the flange 19 in which the upper end of the shaft 23 terminates and upon the upper surface of which is formed a plurality of integral vanes 27, the latter being spaced radially around the flange 26 in such manner as to extend outwardly to the periphery thereof and inwardly to provide a vertically extending opening 28 above the central portion thereof. The upper portions of these vanes are notched in such a way as to receive inwardly thereof the lower portion of the carburetor or charge forming device 29 the inlet opening 30 of which is directly above the opening 28 between the vanes 27.

Projecting axially above the carburetor 29 is a cylindrical boss 32 which provides a housing in which a water or other expansible fluid valve 33 is mounted. The upper portion of the boss 32 is reduced in form to provide an upwardly extending shaft the lower portion of which rotatably supports a friction actuated power unit 35 for changing the angle of attack of the wings 14 whenever this is desired. The upper end of the shaft 34 rotatably supports an air-scoop 36 which is mounted upon the upper surface of the rotor 13 in such manner as to cover a circular opening 37 formed about the axis of rotation thereof. The shaft 34, the fluid valve 33, the carburetor 29, all are rigidly secured to and supported by the vanes 27 and comprise portions of the stator 24. They also include within their axes the central axis of the entire stator 24 and the axis of rotation of the rotor 13.

Beyond the flange 26 the flange 19 has rigidly secured to the upper surface thereof the lower flanged end 38 of an upwardly projecting cylindrically formed casing or frame 39, the axis of which coincides with the axis of rotation of the rotor 13. This casing or frame 39 provides the principal central supporting structure for the various structural elements of the rotor 13.

The rotor 13 comprises a plurality of pairs of radially extending beams 41 each of which is flanged around the edges thereof as indicated at 42 and the upper edges of which are formed to conform to the configuration of the upper surface of the rotor 13. The lower edges of these beams terminate slightly below and in parallel relation to the midplane of the rotor. The beams of each pair of the beam 41 are equally spaced from one another to receive therebetween the extended longitudinal axes of the wings 14. The inner ends of the beams of each pair of the beams are provided with arcuate webs 43 formed to fit the adjacent upper exterior surfaces of the frame 39 and by which webs 43 each pair of beams 41 is rigidly secured to the frame 39.

The upper wall of the rotor 13 comprises a formed outer metallic sheet 44 the lower surface of which is rigidly secured to and supported by the upper contacting surface of an inner concentrically corrugated metallic sheet 46, the two sheets providing an integral covering 45 for absorbing the stresses between the beams 41 both axially and circumferentially with respect to the rotor 13. Covering 45 comprising the sheets 44 and 46 is rigidly secured to and supported by the upper flanges 42 of the beams 41.

The space within the rotor 13 and between the beams 41 is separated from the space below the beams 41 by a planular annular metallic sheet 47 which is secured rigidly to and beneath the lower flanges 42 of the beams 41. Inwardly the sheet 47 terminates at and is secured to the frame 39 whereas outwardly the sheet 47 terminates in a circular reinforcing bead 48 which is spaced a considerable distance from the periphery of the rotor 13 to provide an annular orifice 49 by which the space within the rotor above the dividing wall 47 is placed in communication with that below the wall.

The lower covering 51 of the rotor 13 consists of sheets 52 and 53 which are identical to the sheets 44 and 46 respectively and is supported upon and rigidly secured to an annular flange 54 projecting from the lower edge of the flange 19 of the cylindrical bearing member 18. The inner surface of the covering 51 is rigidly secured to and supported on the lower flanges 55 of spaced pairs of flanged tension members 56, one of each pair of tension members being located directly beneath one of each of the pair of beams 41. The inner extremities of the tension members 56 are rigidly secured in openings 57 formed in boss portions 58 formed in the flange portion 38 of the frame 39. The outer extremities of the tension members 56 are rigidly secured to the outer extremities of the beam 41 against the lower flanges 42 thereof.

A thin annular metallic sheet 59 is secured upon the upper flanges 55 of the tension members 56, the inner edge thereof terminating at the flange 38 of the frame member 39 while the outer edge extends to the opposite ends of the tension members 56 and there terminates at the periphery of the rotor 13. Substantially midway between the ends of the beams 41 and the tension members 56 is a circular supporting ring or web 61 (see Figure 13) flanged at its upper and lower edges as indicated at 62. These flanges are secured to the sheets 47 and 59 in such manner as to stiffen the tension members 56 and to support the load between such members and the beams 41. The web 61 is severed between the flanges 62 and the severed portions thereof are bent outwardly at an angle in such manner as to provide a plurality of vanes indicated at 63.

It will be apparent that the upper flanges of the tension members 56 may be rectilinear from the frame 39 to the web 61 and likewise rectilinear at a slightly different angle to the outer extremities thereof whereas the lower flanges are curved to conform to the curvature of the lower covering 51 of the rotor 13.

Between the inner extremities of the walls 47 and 59 the frame 39 is formed to provide a plurality of angularly disposed vanes 64 which permit communication between the space within the rotor between the walls 47 and 59 and the space within the stator between the vanes 27.

The airscoop 36 which covers the circular opening at the center of the upper covering 45 of the rotor 13 is provided with a centrally disposed bearing 66 which is secured rotatably upon the upper end of the stator shaft 34 by a ring 67. The bearing has attached to the upper closed end thereof the central portion of a bar 68 the opposite ends of which are secured upon a ring 69 which is held slightly above the upper surface of the rotor 13 and beneath which the edges of the airscoop are attached. The airscoop 36 also has attached at the upper surface thereof a rearwardly extending vane 71 which is aligned with the bar 68 but transversely disposed with respect to the inlet opening 72 of the airscoop 36.

It will be apparent that the vane 71 will always maintain the airscoop 36 in such position that the inlet 72 will face the approaching air stream, whether such air stream may be caused by the translatory flight of the aircraft or merely by the wind or both.

When the rotor 13 is rotated in any manner as for example by the operation of a starter attached operatively to the lower end of the cylinder member 18 (not shown) or as a result of the operation of the engines 15 air will be drawn inwardly through the airscoop opening 72 to the compression space 73 which is formed within the upper portion of the rotor 13 between the beams 41 and above the wall 47. To equalize the pressure adjacent the central portion of this compression space and to lighten the beams, the beams 41 are provided with a plurality of openings 74. However such openings are not provided toward the outer extremities of the beams in which region the beams are adapted to provide for the maximum possible centrifugal compression of air within the outer periphery of the rotor.

Since the annular air conduit 50 formed within the lower portion of the rotor 13 is not provided with centrifugal means for compressing air in any wise comparable to the vane effect produced by the rotation of the beams 41 and since the annular conduit 50 is in open communication with the compression space 73 through the annular opening 49 it will be apparent that the centrifugally compressed air within the periphery of the rotor 13 will be forced through the opening 49 into the outer peripheral region within the annular conduit 50. Since inwardly of such outer peripheral region within the annular conduit 50 there is substantially nothing to cause rotation and its consequent centrifugal compression effect upon the air and since the inner extremity of the annular conduit 50 is in open communication with the nonrotating air between the stator vanes 27 through the openings between the frame vanes 64 it will be apparent that the rapidly rotating compressed air within such outer peripheral region will move inwardly by entrainment in the air of lower velocity adjacent thereto. Such entrainment and the consequent decrease in velocity resulting therefrom will reduce the effect of centrifugal force upon the inner movement of the air until the annular conduit 50 and the space between the stator vanes 27 becomes filled with air the linear velocity of which progressively decreases from the linear velocity of rotation at the periphery of the disc to zero linear velocity the linear velocity of rotation of the stator. However due to the continuous delivery of centrifugally compressed air through the opening 49 and assuming a proper restriction in the flow of air from the region of the stator 24 there will be substantially no reduction of pressure in the air in its flow from the periphery of the rotor 13 through the annular conduit 50 and into the stator 24, other than an infinitesimal reduction resulting from the friction of the air upon the various structural surfaces adjacent which the flow of air occurs.

The carburetor 29 provides the outlet for the supercharged air so collected by the operation of the rotor 13 within the region between the stator blades 27.

The carburetor 29 comprises a float chamber 75 which is supplied with hydrocarbon fuel by a conduit not shown leading from a suitable fuel tank located within the cabin. A fuel atomizing jet 76 communicating with the float chamber 75 is located in the carburetor inlet 77 in such manner as to discharge a spray of liquid fuel into the inlet during the passage of air through a venturi 78 located in such passage in operative relation to the jet 76. Above the venturi 78 (Figure 4) there is located a shallow cylindrical mixture distribution chamber 79 formed by the upper wall 81 of the carburetor float chamber 75 and a circular end wall 82 disposed in spaced relation thereabove and formed integrally with respect to the lower end of the boss 32. A vertically movable disc type throttle valve 80 is employed above the outlet end of the venturi 78 for controlling the mixture flow from the carburetor 29 to the distribution chamber 79. Between the lower and upper walls 81 and 82 respectively of the distribution chamber 79 is located a plurality of vertically and radially disposed distribution vanes 83 which at their outer extremities terminate at the periphery of the distribution chamber 79 and at their inner extremities terminate in spaced relation to the axis of the distribution chamber. The axes of the chamber 79, the throttle valve 80, and the carburetor inlet 77, are coincidental with respect to one another. Between the inner extremities of the vanes 83 and vertically movable with respect thereto are located a plurality of arcuate shape stops 84 adapted to fill the space there between and to prevent the flow of fluid thereacross. The lower ends of these stops rest upon the upper surface of the throttle 80 while the upper ends thereof are slidably received in openings 86 formed through the upper wall 82 and within the boss 82. The throttle valve 80 is slotted inwardly from the periphery thereof to receive and to move vertically upon the inner extremities of the vanes 83.

Referring now to Figures 2, 4 and 5 it will be noted that the throttle valve 80 is supported upon a plurality of rods 87 which are so mounted as to slide in openings formed vertically in alternate ones of the vanes 83. These rods extend downwardly through openings not shown in the carburetor inlet 77 and the inner edges of the vanes 27, and upwardly through openings formed vertically through the wall 82. The rods 87 while generally circular in cross section are flattened in the region of the distribution chamber 79 to make the surfaces thereof coextensive with the walls of the vanes 83. The rods 87 are secured to the throttle valve 80 by universal couplings 88 each comprising a short rod 89 mounted in alined cylindrical openings formed in the rods 87. Each of the rods 89 is intersected by a smaller rod 91 which is secured intermediate its ends in an opening formed in the rod 89. The ends of each rod 91 are rotatably received in openings formed in the edges of the openings in the throttle valve 80 adapted to receive the vanes 83. These throttle valve openings are relieved as is indicated at 92 to permit angular as well as vertical movement of the throttle valve 80. Such clearance spaces between the throttle 80 and the rods 87 and vanes 83 may be closed to prevent leakage thereacross by resilient seals 93 which are held in position upon the lower surface of the throttle valve 80 by brackets 94 secured thereto.

The lower ends of the rods 87 project into a space provided above the stator flange 26 by notches 96 cut out in the lower inner edges of the vanes 27. There the lower ends of the rods 87 are attached to the upper surface of a ring 97 by means of universal couplings not shown but similar to the universal couplings 88 shown by Figure 5. The ring 97 comprises one of the parts of a throttle actuating mechanism 98 adapted to be moved vertically, rotatably, and angularly within the notches 96 for correspondingly actuating the throttle valve 80. The relation between the actuating mechanism 98 and the throttle valve 80 established by the rods 87 is such that the actuating mechanism 98 rests upon the stator flange 26 when the throttle valve 80 closes the communication between the carburetor 29 and the mixture distribution chamber 79.

Besides the ring 97 the actuating mechanism 98 comprises a flanged annular channel member 99 in which the ring 97 is rotatably mounted and from one edge of which projects outwardly a lug 101 which in turn is pivotally received in a slot formed in the flanged edge of an annular supporting plate 102. The member 99 and the plate 102 are movable angularly with respect to one another upon a pin 103 which extends through the lug 101 into openings formed in the flanged edge of the plate 102. The plate 102 is supported upon and formed integrally with a plurality of radially disposed bars 104 the inner ends of which are formed integrally upon the upper end of a small hollow cylindrical shaft 105 mounted for vertical and rotational movement in an opening formed centrally of the stator supporting shaft 23. Within the hollow interior of the shaft 105 is a second shaft 106 having its upper end pivotally attached by a pin 107 to the midportion of a rib 108 formed integrally with and diametrically across the inner flange portion of the channel member 99. The end of the shaft 106 is slotted to receive the rib 108 and the rib is provided with an elongated opening not shown to receive the pin 107 and to permit angular movement of the channel member 99 upon its pivot pin 103 in response to vertical movement of the shaft 106.

When, by means of controls in the cabin not shown, the operator of the aircraft moves the shaft 105 vertically upwardly from its position at rest upon the stator flange 26 the throttle 80 will move correspondingly vertically upwardly to provide an equal opening in all directions between the carburetor 29 and the mixture distribution chamber 79. The super-charged air within the stator 24 compressed therein by the operation of the rotor 13 as previously described will flow past the carburetor jet 76 where a proper combustible mixture will be formed and of which mixture equal portions will pass outwardly into the distribution chamber 79 between the vanes 83. From such region the mixture is received by a manifold 109 which is divided into four parts 111 each extending an equal distance around the inner periphery of the manifold and the central portion of each of which communicates with the interior of a mixture supply conduit 112. The opposite end of each of the conduits 112 communicates with one of the engines 15 through the interior of one of the wings 14. Each conduit 112 is threaded into an integral nipple 113 projecting from the manifold 109 and the lower edge of which merges within an annular supporting web 114 the opposite edges of which are formed integrally with respect to the lower extremities of the manifold 109 and the region of the frame 39 located radially outwardly therefrom. As well as supporting the manifold 109 the web 114 limits the super-charged air within the stator 24 to the region below the manifold 109.

Rotatably mounted upon the outer surface of each of the conduits 112 is a torque tube 116 the inner extremity of which terminates within the frame 39 in movable relation to the outer end of one of the nipples 113. Each of such ends is there rigidly secured to a flanged thrust ring 117 the outer surface of which rotatably engages an annular bearing surface 118 provided around the inner end of a bearing 119 formed integrally with the frame 39. To provide for the operation of the thrust rings 117 the web 114 has integral portions 121 projecting upwardly therefrom in which the thrust rings 117 and the ends of the torque tubes 116 are operatively received.

Referring to Figure 18 it will be apparent that each mixture supply conduit 112 at its outer end terminates within and is secured rigidly to a boss 122 formed inwardly of and integrally with respect to the inner end wall 123 of an inwardly extending projection 124 of the outer wall 125 of each of the engines 15. The external shape of the projections 124 is roughly comparable to the shape of the ends of the wings 14 with one end of which the inner wall 123 of each projection 124 is juxtapositioned. The interior of the projection 124 of each engine 15 communicates with the interior of one of the mixture supply conduits 112 and with an elongated annular heating chamber 126 formed in each engine 15 between an inner wall 127 provided therefor and the outer wall 125 thereof. At the rear end thereof the heating chamber 126 of each engine 15 terminates in an annular mixture supply chamber 128 integrally formed between the rear end of the outer wall 125, the rear end of an exhaust tube 129 provided for each engine and a burner 131 also provided for each engine and projecting across the space between the rear extremity of the inner wall 127 which terminates a considerable distance forwardly of the outer wall 125 and the exhaust tube 129.

The carburetor 29 and the fuel burners 131 may be so designed and adjusted that the mixture supply chambers 128 will be supplied with a mixture of fuel and air having a proper ratio for combustion within the engines 15.

In addition to the supercharging of the air employed in the carburetor 29 as a result of the operation of the rotor 13 the combustible mixture supplied to the chambers 128 is additionally centrifugally compressed in the mixture supply conduits 112 also as a result of the operation of rotor 13. This compressed mixture is expanded through the burners 131 forwardly into a combustion chamber 132 formed in each engine by the space between a rear portion of the inner wall 127 and a forward portion of the exhaust tube 129 thereof. A spark plug 133 secured in a boss 134 projecting outwardly from the inner wall 127 of each engine and supplied by a conductor 136 with electrical energy from a suitable source within the cabin not shown provides for initially igniting the charge within the combustion chambers 132 when starting the engines. After such initial ignition the circuit may be broken to the spark plug 133 and the mixture will continue to burn forwardly in the combustion chamber 132 of each engine 15. The design of the combustion chamber 132 of each engine 15 is such that under all normal conditions of operation the combustion of the charge will be substantially complete upon arriving at the region radially outwardly from the forward end of the exhaust tube 129 thereof.

It will be noted that the forward end of the exhaust tube 129 terminates a considerable distance rearwardly of the forward end of the engines. The space thus provided within the engine forwardly of such exhaust tube end and indicated at 137 is provided for expanding the products of combustion delivered thereto from the forward end of the combustion chamber 132. For this purpose the forward end of the exhaust tube 129 is flanged outwardly as indicated at 138 to provide a radially directed annular opening 139 between the rear surface thereof and the forward end of an integral annular wall 141 formed around the forward end of the exhaust tube 129 in such manner as to provide an annular expansible fluid delivery chamber 142. The wall 141, the forward end of the exhaust tube 129 and the engine inner wall 127 all are held in position by a thin integrally formed fin 143 which extends in opposite directions between the expansible fluid delivery chamber wall 141 and the engine outer wall 125. The portion of this fin 143 which extends inwardly from the exhaust tube 129 is provided with an opening 144 at one end communicating with the delivery chamber 142 and at the other with an expansible fluid supply conduit 146 the end of which is rigidly secured in the opening. The conduit 146 for each engine 15 extends inwardly through the mixture supply conduit 112 therefor to a region slightly beyond the inner end thereof where it is secured in an opening in the upper part of this manifold 109. There the conduit communicates with and is supplied with expansible fluid from the expansible fluid valve 33 heretofor referred to.

As will be hereinafter described the expansible fluid valve 33 may supply to the conduits 146 a heavy fog-like mixture of water and air which due to the specific gravity thereof is tremendously effected in the conduits 146 by the rotation of the rotor 13. As a result thereof the mixture is discharged into the expansible fluid delivery chambers 141 where it is immediately discharged at considerable velocity from the annular orifices 139 across the forward ends of the combustion chambers 132 of the engines 15. The finely divided particles of water so distributed across the forward ends of the combustion chambers 132 are almost instantly vaporized by the hot products of combustion emanating from the combustion chambers 132 and thereupon tremendously expand the fluid within in each of the engines 15. The expansion chambers 137 throughout which this vaporization occurs may be of such design and size and the quantity of water delivered by the orifices 139 is such that temperature of the steam and products of combustion delivered into the forward ends of the exhaust tubes 129 is sufficiently above the boiling point of water at the prevalent pressures. Such expansible fluid and products of combustion are thereupon discharged into the atmosphere through the exhaust tubes 129.

Referring to Figures 2 and 6 the expansible fluid valve 33 which is located in the boss 32 projecting upwardly from the carburetor 29 comprises essentially a disc valve 148 and a needle valve 149 the latter being held in position by and at its upper end engaging the lower surface of the former. The disc valve 149 adjacent its periphery is seated upon an annular shoulder 151 formed between a larger upper cylindrical opening 152 containing the disc valve 148 and a smaller lower cylindrical opening 153 containing the needle valve 149. Within the opening 153 there is provided for slidably receiving the upper end of the needle valve 149 a cylindrical guide 154 which is smaller than the opening 153 to provide an annular space through which expansible fluid is supplied to the valve 148. Such guide 154 is supported within the opening 153 by a pair of diametrically opposed webs extending inwardly from the boss 32. The interior of the opening is supplied with a small quantity of air by a pair of diametrically opposed openings 156 (Figure 2) formed in the boss 32 and the outer extremities of which communicate with the space within the frame 39 above the web 114. This space also communicates with the upper central portion of the rotor 13 through openings 158 formed in the upper end wall 159 of the frame 39. The lower end of the needle valve 149 is seated in an orifice 161 formed at the upper end of a water supply passage 162 which communicates by means of passages and conduits not shown with the water supply tank located within the cabin 10. A water pump not shown in the conduit from the tank supplies water to the passage 162 at such pressure that a fine spray will always be formed in the orifice 153 when the valve 149 is open.

The valve 148 is resiliently held in position upon its seat 151 by a spring 163 the upper portion of which is received in a slightly smaller opening 164 formed in the boss 32 above the opening 152. The upper end of the spring 163 abuts the upper end of the opening 164 while the lower end thereof abuts the upper surface of the valve 148. Extending radially outwardly from the lower end of the opening 152 is an annular opening 165 having vertically and radially disposed vanes 166 extending from edge to edge thereof. The depth of the opening 165 is such that the edge of the valve 148 closes the opening 165 unless the valve 148 is raised to some extent upon its seat 151. Beyond the exterior surface of the boss 32 the opening 165 communicates with arcuately formed ports 167 formed around the interior surface of an annular manifold 168 the inner surface of which is rotatably mounted upon the exterior surface of the boss 32. Packing rings 169 set in annular grooves located above and below to ports 167 provide a seal to prevent the leakage of fluid from between the manifold 168 and the boss 32. The manifold 168 is supported in operative position by pairs of diametrically opposed arcuate arms 170 formed integrally between the manifold 168 and an inwardly flanged upper edge portion 179 of the manifold 169. The inner lower surface of the flange portion 179 rotatably engages the upper edge of a flange 181 projecting upwardly from the upper wall 82 of the mixture distribution chamber. Arcuately formed conduits 182 located radially outwardly of the arms 170 communicate at one end with one of the manifold ports 167 and at the opposite end with the inner end of one of the expansible fluid supply conduits 146.

Referring particularly to Figure 6 there is provided for operating the valves 148 and 149 by each of the rods 87 a cam actuating mechanism 171. Each of the mechanisms 171 comprise an arm 173 mounted at one end upon a pin 173 extending within an opening formed across the upper end of each of the rods 87 while the opposite end of the arm is slidably mounted in an opening 174 extending radially inwardly of a cam 175. Beyond the inner end of the openings 174 and adjacent the opposite edge of the cam 175 is a pin 176 which extends transversely across the cam and the opposite ends of which are mounted in openings provided in opposite walls of an inwardly directed slot 177 in which the cam 175 of each mechanism is located. Vertically disposed pins slidably mounted in openings formed in the boss 32 at their upper ends engage the lower surface of the valve 148 adjacent the periphery thereof while at their lower ends the pins engage the surfaces of the cams 175.

When the rods 87 are moved upwardly for opening the throttle valve 89 the pins 178 also open the valve 148 proportionally against the compression of the spring 163. At the same time and to the same extent the valve 149 will be raised from its seat by the pressure of the water contained within the water supply passage 162. In response to any reverse movement of the rods 87 the valves 148 and 149 will tend to be moved toward their respective seats 151 and 161 by the operation of the spring 163. During the time while the valves 148 and 149 are open the less than atmospheric pressure within the opening 153 caused by the centrifugal force affecting the conduits 146, will cause a small flow of air through the openings 156. This air and the fine particles of water provided by the valve 149 will form a relatively heavy fog like supply of expansible mixture to be distributed by the valve 148.

Hence, in response to such operation of the valves 148 and 149 the conduits 146 will supply to the engines 15 a quantity of expansible fluid which is always proportional to the quantity of the charge supplied by the charge forming device 29.

The torque tubes 116 which, as has been previously described, are rotatably mounted with respect to their own axes upon the exterior surfaces of the mixture supply conduits 112 and within the bearings 119 at the inner extremities thereof, extend outwardly through the periphery of the rotor 13 and terminate at the outer ends of the wings 14 just short of the end walls 123 of the engine projections 124 (see Figure 18). The portions of these tubes 118 which extend throughout the wings are surrounded by other tubes 183 which are disposed in annularly spaced relation thereto and held in such positions by annular spacing rings 184 secured at their external and internal surfaces rigidly to the tubes 183 and 116 respectively. There is a plurality of the rings 184 spaced along the tubes in proper locations to take the stresses therebetween. The tubes 183 extend from the outer extremities of the tubes 116 beyond the opposite ends of the wings 14 (Figure 11) and into the rotor 13. There the ends of the tubes are journaled within elongated bearings 185 which are secured rigidly to the outer ends of the pairs of beams 41 by pluralities of pairs of oppositely disposed brackets 186. Thrust bearings 187 rotatably engaging the inner ends of the bearings 185 are rigidly secured to the ends of the tubes 183 to take the thrust resulting from the centrifugal effect involved in rotating the wings.

The wings 14 comprise a pair of inwardly flanged end ribs 188 between which are spaced a plurality of similarly flanged intermediate ribs 189. The ribs 188 and 189 are all of the same external dimensions to provide wings of the same cross section from one end to another. The ribs 189 have openings 191 to lighten the ribs and to permit the flow of air between spaced wing compartments 192 thereby provided. All of the ribs 188 and 189 have annular flanges 193 formed around openings intermediate the ends thereof and adapted to receive and to be rigidly secured upon the exterior surfaces of the tubes 183. The positions at which the ribs 188 and 189 are secured to the tubes 183 may vary angularly and progressively outwardly from the rotor 13 to the engines 15 in such manner as to provide variable and progressively decreasing pitch angles for the wings from the rotor to the engines. The amount of this variation in the pitch of each of the wings may be such that the lift of each wing is substantially constant from one end to another notwithstanding the variation in linear velocities between the opposite ends thereof resulting from the rotary motion thereof. The outer coverings for the wings are provided by metallic sheets 194 wrapped around the flanged outer edges of the ribs, formed to conform to the variation in angles of attack thereof and rigidly secured to the flanges.

In order to be able to vary at the will of the operator the total effective angle of attack or constant pitch of each wing, simultaneously and equally with respect to one another, there is provided the friction actuated power unit 35 heretofore referred to.

To provide for the effective operation of this unit the upper end of the stator shaft 34 is provided with a pilot bearing 195 formed in the upper end 159 of the frame 39. This bearing 195 in order not to effect the operation of the airscoop bearing 66 is separated from such latter bearing by a spacer ring 196 which is secured rigidly to the shaft 34.

Within the frame 39, upon the shaft 34 and between the upper end of the boss 32 and the lower end of the bearing 195 is mounted for rotation upon the shaft 34 an oppositely disposed and spaced pair of gears 197 and 198 and the teeth of which mesh with diametrically opposed portions of a plurality of equally spaced gears 199. There is one of the gears 199 for each of the wings 14. The gears 199 the axes of which intersect at a point within the axis of shaft 34 each are mounted rigidly upon the inner ends of radially disposed shafts 201 the intermediate portions of which are rotatably mounted in bearings 202 formed integrally with the frame 39 and projecting inwardly therefrom and abutting the outer ends of the gears 199 to provide thrust bearings for the latter to hold the same in mesh with the gears 197 and 198. Beyond the bearings 202 the shafts 201 have secured thereto pinions 203 which mesh with other similar pinions 204 rigidly secured on the upper ends of shafts 205. Bearings 206 formed integrally with and projecting outwardly from the frame 39 provide thrust bearings for holding the gears 204 in operative positions and for supporting rotatably the upper ends of the shafts 205. The lower ends of the shafts 205 are provided with worms 207 (see Figure 4) which are adapted to operatively engage worm wheels 208 each of which is rigidly secured upon one of the shafts 116 just beyond but rotatably engaging the ends of the bearings 119. Pairs of bearings 209 for the shafts 205 formed integrally with and projecting outwardly from the frame 39 above and below the ends of the worms 207 hold the worms 207 and the worm wheels 208 in operative relation.

The friction involved in operating the various parts of the power unit 35 and the purchase between the worms 207 and the worm wheels 208 is such as to prevent the rotation of the torque tubes 116 and consequently any change in the angle of attack of the wings 14 until such time as the operator may elect to change the angle of attack of the wings by operating the power unit 35 to rotate the shafts 205 in one direction or another. Hence, it will be apparent from the drawings that the mechanism of the power unit 35 thus far described will merely rotate idly upon the shaft 34 during the normal operation of the rotor 13.

In order that the operator may be able to vary at will the angle of attack of the wings it is necessary only to brake or slow down the idle rotation of one or the other of the gears 197 or 198. This will cause rotation of the gears 199 and the worms 207 in one direction or another depending upon which of the gears 197 or 198 is so effected.

To effect this purpose, a pair of oppositely disposed annular brake pistons 211 are mounted upon the shaft 34 between the gears 197 and 198. These pistons are secured against rotation upon the shaft 34 by splines 212 mounted in grooves formed in the external surface of the shaft and the internal surfaces of the pistons 211. The ends of the pistons 211 have frictional material or brake lining discs 213 secured thereon, the position of such discs being such that the surfaces thereof normally are disposed in spaced relation to the interior and adjacent surfaces of the gears 197 and 198. The interior surfaces of the pistons 211 are disposed in sliding contact with the shaft 34 upon the splines 212 while the exterior surfaces thereof are slidably disposed in annular cylinders 214 the inner edges of which rotatably engage the shaft 34. Between the inner extremities of these cylinders and the adjacent ends of the splines 212 are relatively loosely confined the central annular portions of springs 215, each of said springs comprising a plurality of radially disposed leaf portions which are flexed and supported by inwardly disposed projections 216 extending from the outer walls of the pistons 211.

These springs normally hold the pistons 211 in retracted positions so that the brake discs 213 will not engage either of the gears 197 or 198. However, in the event fluid under pressure sufficiently greater than the pressure in the upper portion of the frame 39 is introduced into one or the other of the cylinders 214 then the piston therein will be moved against the tension of its spring 215 to cause the brake disc of that cylinder to engage one or the other of the gears 197 or 198.

In order to bring about this result (see Figures 2, 7, 8, 9, and 10) there is rotatably supported upon the shaft 34 between the adjacent inner portions of the cylinders 214 an inner annular rotary valve sleeve 217 on which in turn is rotatably mounted an outer annular rotary valve sleeve 218 the opposite ends of which are formed integrally with the cylinders 214. The inner valve sleeve 217 is provided with a pair of arcuate ports 219 and 221 spaced from one another axially of the shaft 34 and extending in opposite directions circumferentially of the sleeve 217 from the adjacent edges of air supply ports 222 and 223, respectively. The air supply ports 222 and 223 each communicates with an air supply conduit 224 formed by providing an opening extending longitudinally of the shaft 34. This opening 224 extends downwardly through the shaft 34, the boss 32, and various available walls of the carburetor 29 and there through an opening not shown communicates with the space within the stator 24 between the fins 27. In such region the opening and the conduit 224 are supplied with supercharged air which results from the centrifugal compression of air within the rotor 13 as previously described. The ports 219 and 221 are adapted to co-operate respectively with similar ports 225 and 226 formed in the inner surface of the outer sleeve 218 directly oppositely thereto and extending in opposite directions around the sleeve 218. The port 226 is connected by a passage 227 formed in the sleeve 218 with the interior of the piston and cylinder adjacent the gear 197 while the port 225 is provided with a similar passage not shown connecting this port with the interior of the piston and the cylinder adjacent the gear 198. In the intermediate positions in which the parts are shown in Figures 7 and 8 the sleeve 227 in both instances just closes the air supply conduits 222 and 223 and the ports 225 and 226 are just out of communication with the ports 219 and 221.

From Figure 7 is will be apparent that if the sleeve 217 is rotated in a clockwise direction the air supply passage 222 will be immediately placed in communication with the port 225 through port 219 and air under pressure will be supplied to the piston and cylinder adjacent the gear 198. The resultant movement of the brake disc of the cylinder will slow the idle rotation of the gear 198 and as has been previously described this results in the operation of the worms 209 to change the angle of attack of all the wings in one direction.

At the same time it will be apparent from Figure 8 that the described clockwise movement of sleeve 217 will only further close port 226 from communication with the air supply passage 223.

However, and still referring to Figure 8, it will be apparent that any counterclockwise rotation of the sleeve 217 will immediately open communication between the ports 223 and 226 and air under pressure will then be supplied to the piston and cylinder adjacent the gear 197. This, as has been previously described will oppositely rotate the worms 207 and consequently change the angle of attack of the wings in the opposite direction.

Referring again to Figure 7 it will be apparent that this counterclockwise movement of the sleeve 217 only further closes the communication between the supply port 223 and the port 225.

In order to be able to discontinue the change in angle of attack of the wings in opposite directions as described it is necessary to move the sleeve 218 an amount that is equal in angular extent to that in which the sleeve 217 has been moved. If this is done it will be apparent that the ports 225 will cut off the communication with the ports 222 or 223, whichever may exist.

To bring about such corresponding rotation the outer sleeve 218 has secured thereto a circular cam 228 which is rotatably mounted within another circular cam 229, the two cams being of equal excentricity although unequal in diameter. Surrounding the two cams and rotatably engaging the outer surface of the cam 229 is an annular ring 231 rigidly secured at diametrically opposed regions to the inner ends of oppositely threaded screws 232 and 233. The screws extend into correspondingly threaded openings 234 formed in adjacent ends of an oppositely disposed pair of the shafts 201.

It will be apparent from Figures 7 and 8 that when the worms 207 are turned in one direction the screws 232 and 233 will both move an equal distance in the same direction. Also it will be apparent that rotation of the worms 207 in the opposite direction will result in equal but opposite movements of the screws 232 and 233. It will further be apparent from these figures that such movements of the screws 232 and 233 will actuate the cams 228 and 229 to rotate the sleeve 218 in either direction. By properly relating the pitch of the screws 232 and 233 to the other thread and gear mechanisms of the unit the sleeve 218 may be made to move angularly exactly the amount by which the sleeve 217 was moved, in either direction.

Again referring to Figures 7 and 8 it will be apparent that a similar arrangement of exhaust ports is provided in the sleeves 217 and 218. These comprise oppositely extending ports 235 formed in the sleeve 217 and oppositely extending ports 236 formed inside the sleeve 218. These are adapted to communicate with spaced exhaust passages 237 which at their inner ends communicate with an exhaust passage 238 extending downwardly of the shaft 34 and there by means of an opening not shown communicating with the space within the frame 39 above the web 114. The exhaust ports however, as will be seen by Figures 7 and 8 are arranged so that the exhaust passages 237 will always be provided with slightly open means of communication with both of the piston and cylinder units whenever communication is broken between the air supply passages 222 and 223. Such means of communication however will be immediately cut off whenever any air is supplied to the cylinders by the passages 222 or 223.

It will be apparent from the foregoing that the angle of attack of the wings may be changed to any desired extent by the movement in either direction of the sleeve 227 and that when the angle of attack of the wings has been changed to such desired extent that the operation of the power unit 35 will be discontinued by the movement of the sleeve 218 resulting from the movement of the wings. Thereafter the worms 207 will retain the wings in such desired position by reason of their purchase upon their respective worm wheels 208.

To move the sleeve 217 to any desired extent in response to the will of the operator there is provided an arcuate groove 239 (Figure 9) which is disposed between the spaced groups of ports illustrated by Figures 7 and 8. The groove 239 is adapted to co-operate with and to receive a rotary type piston 241 which is secured within a radially disposed opening formed in the shaft 34.

On one side of the piston 241 there is provided an oil supply port 242 which communicates with the portion of the groove 239 on such side of the piston 241 through an opening 243. On the opposite side of the piston is provided an air exhaust passage 244 which similarly communicates with the groove 239 on such side of the piston 241 through an exhaust opening 246. The exhaust passage 244 is connected to the exhaust passage 238 used for exhausting the ports illustrated by Figures 7 and 8.

The oil supply passage 242 extends downwardly through the shaft 34 and various other elements of the stator 24 through various passages not shown and by means of a conduit 247 (Figure 10) connected to such passages eventually communicates with the interior of an oil displacement pump 248. The pump has a pump cylinder 249 provided at its inner end with an escape groove 251 and a supply passage 252 the latter communicating at its upper end with an oil supply tank 253. The piston 254 within the cylinder 249 is actuated by a rod the opposite end of which is connected by a pin 256 to a lever 257. One end of the lever 257 is pivoted by a pin 258 upon a frame 259 the opposite end of which provides an arcuate guide 261 for the lever 257. The end of the lever is provided with a detent mechanism by which the lever may be retained in any desired position upon the guide 261.

It will be apparent from Figure 10 that when the lever 257 is moved in either direction the oil beyond the piston 254 will either be displaced or replenished and from Figure 9 it will be apparent that the sleeve 217 will be moved in either direction by the effect of such oil movement upon the piston 246.

By operating the lever 257 the operator may change the angle of attack of the wings to any desired extent in either direction.

How to start the engines by the use of a starter for rotating the rotor 13 and by the use of the spark plugs 133 for igniting the charges therein and how to supply any desired amount of combustible mixture and expansible fluid to the engines by actuating the throttle valve 80 and the expansible fluid supply valve 33 to any desired extent by vertically moving the shaft 105 in opposite directions, already has been described. It may now be stated that when the engines are to be started the lever 257 should be moved into such position as to provide the wings with minimum angle of attack. In such circumstances the drag of the wings will be reduced to the minimum, the lift resulting from the rotation of the wings will be the minimum, and the engines can be started easily and brought up to normal operating speed without lifting the aircraft from the ground. When it is desired to lift the aircraft vertically off the ground after the engines have attained such normal operating speeds the operator simultaneously moves the lever 257 to increase the angle of attack of the wings, thereby providing sufficient lift to result in the vertical elevation of the aircraft at the desired rate, and, further increases the supply of combustible mixture and expansible fluid to the engines 15 by further elevating the shaft 105 to maintain the normal operating speed of the engines notwithstanding the increase in the load thereon.

When the aircraft has attained sufficient altitude that the operator may consider it desirable to commence translatory flight the operator merely operates the controls in the cabin in such manner as to further elevate the rod 106 which previously had been moved upwardly only by the upward movement of the shaft 105. Such further movement of the shaft 106 results in a tilting movement of the channel element 99 upon its pin 103 in response to which movement the throttle valve 80 and the disc valve 148 will be proportionally tilted to provide successively to the engines unequal charges of combustible mixture and of expansible fluid at different degrees of rotation throughout each revolution of the rotor 13. However each engine will be supplied with the same amount of combustible mixture and expansible fluid that any other engine receives at the same degree of rotation of the rotor. The result of such unequal distribution of combustible mixture and expansible fluid will be to unbalance the equilibrium of forces upon the rotor which previously caused the aircraft to rise vertically. Since this difference between all of the forces effecting the rotor effects the axis of rotation thereof in the same direction, the aircraft will be moved laterally by cyclic propulsion resulting from the difference between the maximum and minimum charges successively supplied to the engines.

It will be observed that the lateral movement of the aircraft produces a greater air speed over the advancing wings, or wings moving in the direction of flight than it does over the retreating wings or wings moving in the direction opposite the direction of flight. Since the wings are held rigidly in any position once the angle of attack is established a greater lift upon the rotor will be provided on the side of the advancing wings than will be provided on the side of the retreating wings. This difference in lift is disposed of as follows:

Referring to Figures 15, 16, 17, and 18 it will be noted that the front portions of the wings are provided with a plurality of openings 263 extending from adjacent the inner ends of the wings to adjacent the outer ends thereof. These openings are staggered in such manner as practically to provide continuous openings in the wings throughout the extent thereof. Beneath the openings 263 and inside the wings 14 the ribs 189 are cut out in such manner as to receive flanged semicylindrical conduits 264 which are secured rigidly to the ribs 189 and to the wing coverings 194 on the interior surfaces thereof. These conduits are all open to the interiors of the wings 14 at the inner extremities thereof as is indicated at 265. The conduits 264 also are closed to the interior of the wings adjacent the opposite ends thereof as is indicated at 266. The conduits 264 extend beneath and only slightly beyond the extent of the openings 263.

When an advancing wing is effected by a greater air speed than a retracting wing the openings 263 by entrainment and as a result of the instantaneous difference in pressure which occurs, tend to exhaust the conduit 64 until the pressure within the conduit is equal to the pressure immediately adjacent and above the openings 263.

Conversely when a retreating wing is effected by a lesser air speed than an advancing wing the openings 263 by entrainment and by the resultant difference in pressure which occurs, tend to fill the conduit 64 until the pressure within the conduit is equal to the pressure immediately adjacent and above the openings 263.

The pressure within the wings and in communication with the conduits 264 through the openings 265 is effected by centrifugal force resulting from the rotation of the wings and generally speaking increases outwardly from the inner ends of the wings from a value substantially equal to the average pressure in all of the conduits 264. Assuming a linear speed at the outer ends of the wings of fifty thousand feet per minute it will be apparent that the pressure within the wings at the outer ends thereof will be considerably greater than at atmosphere whereas the pressure of the air at the inner ends of the wings will be somewhat less than one atmosphere. Since compressed air at such variable pressures as exist from one end to another of these wings is relatively unstable and can be easily caused to vibrate even by the most minute of forces it will be apparent that the previously described variation in pressures within the conduits 264 will disturb the equilibrium of the variably compressed air within the wings and will cause the latter to vibrate. Such vibration may be accentuated enormously by the property of resonance which depends merely upon the design of the column, tube, or chamber in which the vibration takes place. It will be noted that the ribs 188 and 189 of the wings 14 between which openings 191 are formed provide separate compartments in which vibrating air within the wings will expand from one compartment to another through the openings 191. By providing a proper number of such compartments and a proper size for the openings therebetween the wings may be made to have a period of vibration for the compressed air therein which is equal to the number of revolutions per minute of the rotor 13. With such period of vibration each variation in pressure that occurs within the conduits 264 and which through the openings 265 is communicated to the inner ends of the wings 14, will cumulatively effect the pressure within the wings and will cause a pumping or breathing action through the openings 263.

Hence, in an advancing wing the compressed air in the wing will be pumped outwardly through the conduit 264 and the openings 263 and into the region above the wing. Such pumping of air in the region above the wing will tend to decrease the lift of the wing notwithstanding the greater air speed thereover.

Conversely, in a retreating wing the compressed air in the wing will pump air inwardly through the conduits 264 and the openings 263 and away from the region above the wings. Such pumping of air away from the region above the wings will tend to increase the lift of the wing notwithstanding the lesser air speed thereover.

By properly designing the wings to take advantage of this property of resonance so applied thereto the lift of the advancing wing may be decreased and that of the retreating wing increased to such an extent that a condition of harmonic stabilization will be produced and hence the lateral stability of the rotor will be assured during transverse flight at any speed.

In order to change the direction of flight it is only necessary for the operator to operate the controls in a manner which will result in the rotation of the shaft 105, the controls being constructed in such manner as to move the shaft vertically for increasing or decreasing the supply of combustible mixture and expansible fluid to the engines and rotatably for changing the angular position of the diametrically opposed regions at which the maximum and minimum quantities of combustible mixture and expansible fluid are supplied to the engines. Such rotation of the shaft 105 correspondingly rotates the tilted actuating mechanism 98 and the proportionally tilted valves 80 and 148. Consequently the valves supply the maximum and minimum quantities of combustible mixture and expansible fluid successively to the engines at different angular positions relative to the stator 24.

I claim:

1. A direct reaction engine comprising a hollow shell adapted for rotation about a transversely disposed axis, a combustion chamber associated with the periphery of said shell and having an exhaust passage projecting therefrom in tangential relation to the circular path of movement of said combustion chamber about the axis of said shell, centrifugal compression means within said shell and dividing said shell into a plurality of passages extending from a centrally disposed air inlet opening formed in said shell to the periphery of said shell, annular passage means formed in said shell at one side of said centrifugal compression means and connecting the periphery of said shell to a central portion of said shell adjacent said inlet opening, centrifugal compression means connecting said central portion of said shell to said combustion chamber, and means for supplying fuel to said combustion chamber.

2. A direct reaction engine comprising a hollow shell adapted to rotate about a transversely disposed axis within the periphery of said shell, a combustion chamber associated with the periphery of said shell and having an exhaust passage leading therefrom in tangential relation to the path of rotation of said combustion chamber, means for supplying fuel and air to said combustion chamber, means for igniting said fuel and air for impelling said combustion chamber and said shell about said axis, parallel centrifugal compression means within said shell for providing multiple stage compression of said air supplied to said combustion chamber, said multiple stage compression means forming a fluid compression loop within said shell, said loop having ends extending between the axis of said shell and said combustion chamber.

3. A direct reaction engine comprising a hollow shell adapted for rotation about a transversely disposed axis, said shell having an annular chamber formed therein and extending from adjacent said axis to the periphery of said shell, a combustion chamber associated with the periphery of said shell for rotating said shell upon said axis, multiple stage compression means associated with said shell for supplying a fluid charge to said combustion chamber, one stage of said compression means having discharge means connected to the outer periphery of said annular chamber and another stage of said compression means having an inlet connected to the inner periphery of said annular chamber, said last mentioned stage of said compression means being centrifugal compression means extending from said inner periphery of said annular chamber to said combustion chamber and externally with respect to said annular chamber.

4. A direct reaction engine comprising a hollow shell adapted to rotate about a transversely disposed axis within the periphery of said shell, a combustion chamber associated with the periphery of said shell for rotating said shell about said axis, a wall disposed within said shell for dividing said shell into parallel annular compartments extending from the central portion to the periphery of said shell, centrifugal compression means in one of said compartments for compressing air within said shell from an inlet opening adjacent the axis of rotation of said shell to the periphery of the other of said annular passages, and centrifugal compression means connecting the central part of said other of said annular passages to said combustion chamber.

5. A direct reaction engine comprising a hollow shell adapted for rotation about a transversely disposed axis, said shell having an annular chamber formed therein and adapted to extend from the periphery of said shell toward the axis of rotation of said shell, a combustion chamber associated with the periphery of said shell, means for compressing air into the outer periphery of said annular chamber, means for compressing air from the inner periphery of said annular chamber to said combustion chamber, means for supplying fuel to said combustion chamber, and means for increasing the flow of said fuel to said combustion chamber on one side of said axis of rotation and for decreasing the flow of fuel to said combustion chamber on the opposite side of said axis of rotation of said shell throughout successive revolutions of said shell.

6. A direct reaction engine comprising a hollow annular shell adapted for rotation about a transversely disposed axis extending within the periphery of said shell, a combustion chamber associated with the periphery of said shell for rotating said shell about said axis, a centrally disposed inlet formed in said shell for supplying air to said shell adjacent the axis of rotation of said shell, centrifugal compression means disposed within said shell and communicating with said inlet for compressing air from said inlet into the periphery of said shell, an annular compartment formed in said shell and extending between the periphery of said shell and the central portion of said shell for receiving said air at the periphery of said shell and for conducting the same to the central part of said shell, and centrifugal compression means within said shell and connecting said central part of said shell to said combustion chamber.

7. A direct reaction engine comprising a hollow annular shell adapted for rotation about a transversely disposed axis extending within the periphery of said shell, a partition dividing said shell into a pair of annular compartments extending from the central portion of said shell to the periphery of said shell, a plurality of beams disposed in one of said annular compartments between and outer wall of said shell and said partition and extending from adjacent the central portion of said one of said annular compartments to the periphery of said shell, said partition being formed to provide communicating passages between the spaces between said beams and the outer extremities of the other of said annular compartments, a combustion chamber associated with the periphery of said shell for rotating said shell about said axis, air inlet means formed in said shell for supplying air to be compressed to the space between the inwardly disposed ends of said beams, and means for supplying air from the central portion of said other of said annular compartments to said combustion chamber for supporting combustion in said combustion chamber.

8. A direct reaction engine comprising a hollow annular shell adapted for rotation about a transversely disposed axis extending within the periphery of said shell, a wall for dividing the interior of said shell into a pair of annular compartments extending from the central part of said shell to the periphery thereof, a plurality of partitions in one of said annular compartments for dividing said compartment into a plurality of passages extending from the central part of said one annular compartment to the periphery of said one annular compartment, annular passage means formed in said wall for providing communication between said annular compartments at the periphery of said shell, means disposed in the central part of the other of said annular compartments for preventing rotation of air in said central part of said other annular compartment, a combustion chamber associated with the periphery of said shell for rotating said shell upon said axis, and centrifugal compression means in said shell for compressing air from said central part of said other annular compartment to said combustion chamber.

9. A direct reaction engine comprising a hollow annular shell adapted for rotation about a transversely disposed axis extending within the periphery of said shell, a stator projecting within said shell adjacent the axis of said shell and having vanes positioned to oppose rotation of air within the central part of said shell, a charge forming device located within said stator for forming a charge of fuel and air within said stator, multiple stage compression means within said shell for compressing said charge toward the periphery of said shell, a combustion chamber associated with the periphery of said shell for converting said charge into products of combustion, and means for discharging said products of combustion tangently with respect to the path of movement of said combustion chamber.

10. A direct reaction engine comprising a hollow annular shell adapted for rotation about a transversely disposed axis extending within the periphery of said shell, a heating chamber associated with the periphery of said shell for heating expansible fluid within said chamber, said heating chamber having associated therewith a tangently directed passage leading from said heating chamber for discharging said expansible fluid from said heating chamber, and centrifugal compression means associated with the interior of said shell and having passage means for said expansible fluid, said passage means being directed radially outwardly and inwardly and outwardly within said shell.

11. A direct reaction internal combustion engine comprising a hollow annular shell adapted for rotation about a transversely disposed axis, a combustion chamber having a tangently disposed exhaust passage associated with the periphery of said shell for rotating said shell about said axis, a plurality of devices within said shell for centrifugally compressing air from the central part of said shell to the periphery of said shell, an air inlet formed in said shell and leading to the inlet end of one of said devices, and an annular chamber formed in said shell and connecting the outlet end of said one of said devices to the inlet end of the other of said devices, the outlet end of said other of said devices being connected to said combustion chamber for supplying compressed air to said combustion chamber.

12. A direct reaction engine comprising a hollow annular shell adapted for rotation about a transversely disposed axis, a combustion chamber associated with the periphery of said shell for rotating said shell upon said axis, a plurality of centrifugal compression means within said shell for compressing a fluid charge within said combustion chamber, and an annular passage formed in said shell and connecting the outer end of one of said compression means to the inner end of another.

13. A direct reaction engine comprising a hollow annular shell adapted for rotation about a transversely disposed axis, a combustion chamber associated with said shell for rotating said shell upon said axis, multiple stage centrifugal compression means within said shell and having radially outwardly and inwardly and outwardly disposed passages formed therein for supplying an expansible charge to said combustion chamber, and a charge forming device located adjacent said axis of rotation of said shell and interposed between two stages of said multiple stage compression means for supplying combustible fluid to said combustion chamber.

14. A direct reaction engine comprising a hollow annular shell adapted for rotation about a transversely disposed axis, a combustion chamber having inlet and exhaust passages formed in said shell, said exhaust passage having a tangently disposed end associated with the periphery of said shell for rotating said shell about said axis, multiple stage compression means within said shell and forming a part of said inlet passage for compressing the expansible fluid expanded in said combustion chamber and discharged through said exhaust passage and fluid control means having an infinite number of positions progressively obstructing one of said passages during each revolution of said shell, said means in diametrically opposed positions being disposed oppositely and being moved progressively to obstruct said passage to any extent and to the same extent in the same positions throughout successive revolutions of said shell.

15. A direct reaction engine comprising a hollow annular shell adapted for rotation about a transversely disposed axis, combustion chamber means having inlet and exhaust passage means formed in said shell, said exhaust passage means having tangently disposed end means associated with the periphery of said shell for rotating said shell about said axis, multiple stage compression means within said shell and forming a part of said inlet passage means for compressing expansible fluid expanded in said combustion chamber means and discharged through said exhaust passage means, means controlling the flow of fluid through said passage means, and actuating means for said controlling means, said actuating means being operable progressively to move said controlling means to decrease to any extent the flow of fluid through all of said passage means on one side of the axis of rotation of said shell and progressively to increase to any extent the flow of fluid through all of said passage means on the opposite side of the axis of rotation of said shell and one the same sides of said axis throughout successive revolutions of said shell.

16. A direct reaction engine comprising a hollow annular shell adapted for rotation about a transversely disposed axis, combustion chamber means having inlet and exhaust passage means formed in said shell, said exhaust passage means having tangently disposed end means associated with the periphery of said shell for rotating said shell about said axis, multiple stage centrifugal compression means within said shell for compressing expansible fluid expanded in said combustion chamber means and discharged through said exhaust passage means, means controlling the flow of fluid through said passage means, and actuating means for said controlling means, said actuating means being operable progressively to move said controlling means to decrease to any extent the flow of fluid through all of said passage means on one side of the axis of rotation of said shell and progressively to increase to any extent the flow of fluid through all of said passage means on the opposite side of the axis of rotation of said shell and one the same sides of said axis throughout successive revolutions of said shell.

LEWIS D. BURCH.

REFERENCES CITED

The following references are of record in the file of this patent:

UNITED STATES PATENTS

| Number | Name | Date |
|---|---|---|
| 1,267,105 | Mulligan | May 21, 1918 |
| 1,569,607 | Beck | Jan. 12, 1926 |
| 2,033,342 | Lansing et al. | Mar. 10, 1936 |
| 2,173,333 | Jacobs | Sept. 19, 1939 |
| 2,394,513 | Chappedelaine | Feb. 5, 1946 |
| 2,407,824 | Fisher | Sept. 17, 1946 |
| 2,499,863 | Hart | Mar. 7, 1950 |
| 2,509,359 | Margolis | May 30, 1950 |

FOREIGN PATENTS

| Number | Country | Date |
|---|---|---|
| 14,559 | Great Britain | June 22, 1909 |
| 366,450 | Great Britain | Mar. 3, 1932 |
| 434,531 | France | Nov. 29, 1911 |
| 685,830 | France | Apr. 7, 1930 |
| 246,446 | Italy | Mar. 23, 1926 |
| 161,928 | Switzerland | Aug. 1, 1933 |